United States Patent Office 3,450,829
Patented June 17, 1969

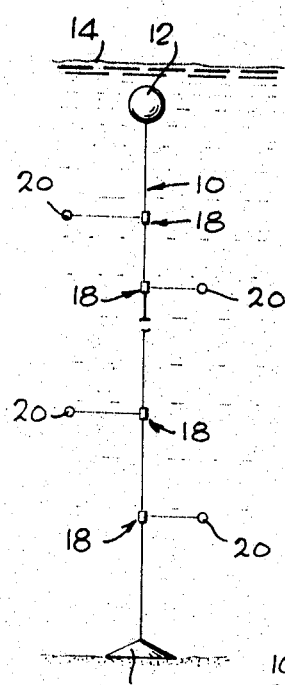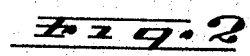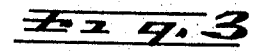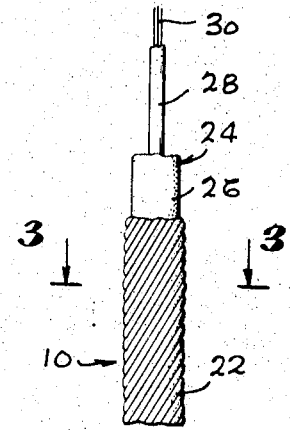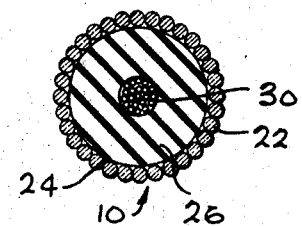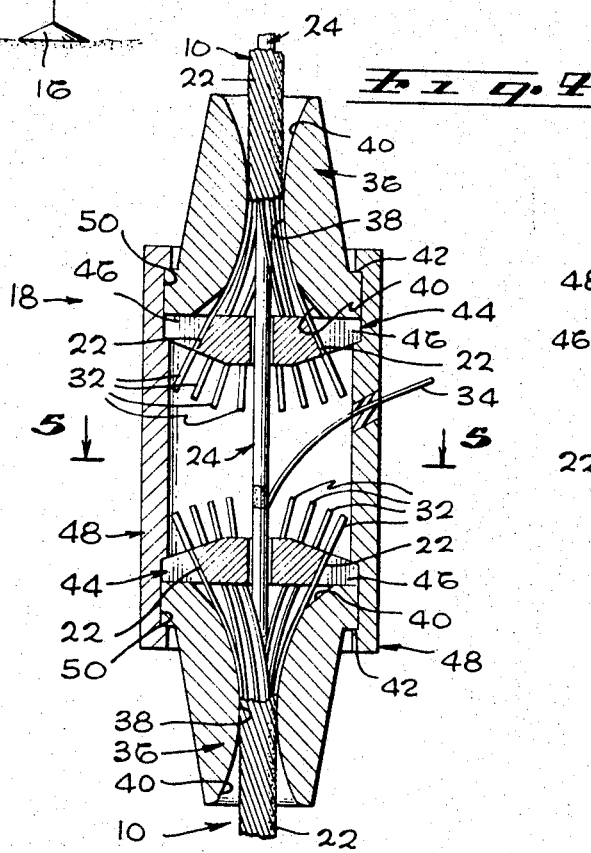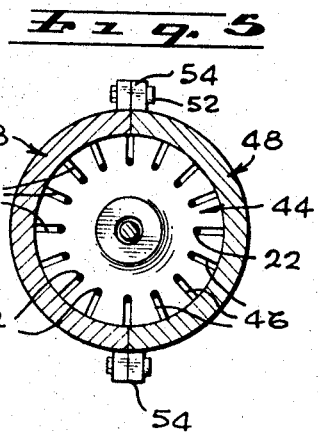

3,450,829
PROCESS FOR SALVAGING ARMORED CABLE
AND STRUCTURE USED FOR THE SAME
Albert E. Paul, Savage, Md., assignor to The Bunker-Ramo Corporation, Canoga Park, Calif., a corporation of Delaware
Filed Nov. 3, 1966, Ser. No. 591,858
Int. Cl. H02g 15/08, 15/02
U.S. Cl. 174—89                             8 Claims

ABSTRACT OF THE DISCLOSURE

The disclosure relates to a cable connecting structure for attaching two ends of a previously used armored cable. The connecting structure includes a substantially non-corrosive malleable metal coating provided on the opposing sets of the exposed ends of the armored cable's protective wire. Such a coating serves as a malleable interface for permitting a swaged member to be attached to the ends of each of the protective wires. The connecting structure also includes a pair of foraminated discs for receiving each set of the protective wires and engaging the swaged members in a load bearing relationship. These discs are then joined together by a cylindrical housing to provide a load bearing transmission path between the two sets of protective wires. The disclosure also relates to a process for treating the ends of the protective wires for depositing the layer of corrosion resistant malleable metal thereon.

---

This invention relates both to a process enabling the salvaging of underwater cable and to load bearing structures adapted to be utilized with such salvaged cable.

Armored marine cable is normally fabricated so as to have a core area or region surrounded by protective metal wires. Such a core area or region normally includes an elongated body or sleeve of insulation surrounding a plurality of electrical conductors which are protected by both the insulation and the metal wires against damage. Frequently, the metal wires forming the outside of the cable are wound around the insulation but on occasion they may be applied in other manners, as for example, by braiding.

These wires not only exercise a protective function but they serve to take up and support the principal weight of the cable and various equipments attached to or carried by the cable. Generally, these wires are formed of steel. It is well known that steel is subject to attack and corrosion when utilized in contact with various substances such as both fresh and sea water. As a consequence, it is conventional practice to coat the steel wires prior to their being wound or braided around the electrical conductor with an adherent zinc coating.

Zinc coatings may be easily and conveniently applied to the steel wires prior to their use by simple hot-dipping procedures at a comparatively nominal cost.

Armored cables for marine use are, by virtue of their construction, relatively expensive. Because of this, it is normally desired to salvage these cables after they have been used for one operation so that they may be used again. Such re-use frequently involves cutting the cable so as to permit access to the electrical conductors included in the core area or region of the cable, as for example, so as to permit an electrical connection to be made. Normally, load bearing members are attached to the cable at the point where the cable has been cut, so that the equipment attached to the electrical conductors is supported by the cable.

The re-use in this manner of marine armored cable is handicapped by the fact that the zinc coating originally applied to the protective wires of such cables is subject to corrosive attack. Such attack normally involves galvanic action, as for example, when the cable is utilized in many different types of environment. Because of such corrosive attacks, the zinc coating is disrupted and/or lost in many circumstances to such a degree that it can not serve to facilitate the repeated production of a relatively strong swaged type joint.

In typical marine installation of underwater cable borne electrical systems it is frequently desired to modify or alter the system configuration by adding underwater elements such as sensors, transducers, etc. To accomplish this it is necessary to raise the cable along with its attached system equipment and sever it in order to attach the additional elements. A typical swaged type connector is necessary in accordance with present practice to carry the cable to a location where a hot-dip deposition of zinc can be applied. This is not only expensive from the standpoint of time, but such redeposition can rarely be carried out without detrimentally affecting the electrical insulation and core conductors.

The present invention is intended to provide a method for the "on site" treatment of the ends of the protective wires binding an armored marine cable so as to provide on these ends a coating which can be used in creating a comparatively "strong" swaged joint and not readily subject to corrosive attack and which is capable of being re-used. Thus, the present invention contemplates the "on-site" deposition on the ends of the protective wires of such cables of malleable metal layers capable of serving as malleable interfaces during the use or attachment of swaged sleeves or like objects.

This invention, however, also concerns the attachment of force-transmitting protective structures to armored marine cables at locations where various equipments can, if desired, be attached to the electrical conductors of such cables. These structures are utilized where the steel wires in such cables are cut. In the case of previously used cables these structures utilize as an integral part, malleable metal layers on the ends of the steel wires, as indicated in the preceding paragraph.

The structures of the present invention may be easily and conveniently manufactured and used at a comparatively nominal cost. The malleable metal layers indicated in the preceding discussion may also be created in accordance with this invention in a relatively easy and convenient manner at a comparatively nominal cost. These factors are considered extremely important since one of the purposes of this invention is to teach procedures for modifying previously used armored marine cables "on site" at marine locations so that such cables can be salvaged, modified, or re-used as desired.

Accordingly, it can be indicated that this invention concerns the treatment of the ends of steel wires in marine cables so as to place upon these ends a comparatively thin, malleable copper coating capable of serving as a malleable interface in the creation of comparatively strong swaged type connections. In essentially summary form, it can be indicated that this invention also concerns connecting structures which involve swaged members upon the ends of the steel wires in armored marine cables, means physically engaging the swaged members upon opposed ends of such wires in a cable and mechanical means connecting such physically engaging means so as to create a relatively strong, force-transmitting, protective joint around the core region of the cable between opposing ends of the severed wires.

The features of the present invention which are believed to be novel are set forth with particularity in the appended claims. The present invention, both as to its organization and manner of operation, together with fur- FIGURE 1 is a diagrammatic view showing the use of an armored marine cable;

FIG. 2 is an enlarged cut-away view showing the construction of the cable illustrated in FIG. 1;

FIG. 3 is an enlarged cross-sectional view of the cable taken substantially along the plane 3—3 of FIG. 2;

FIG. 4 is a cross-sectional view of a connecting structure utilizing this invention as employed with the cable shown in FIG. 1;

FIG. 5 is a cross-sectional view taken substantially along the plane 5—5 of FIG. 4.

Figure 6:
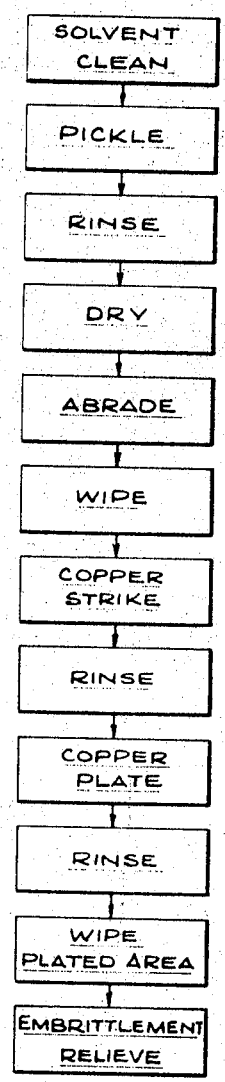
FIG. 6 is a flow diagram indicating preferred steps in placing a malleable metal coating upon the ends of steel wires employed in the cable shown in the preceding figures.

Referring to FIG. 1, there is shown a typical armored marine cable 10 depending from a conventional float 12 disposed on the water surface 14. The end of the cable 10 remote from the float 12 is attached to an anchor structure 16 in the use illustrated in FIG. 1. In this use, a plurality of connecting load bearing structures 18 are employed in connection with spaced break-outs provided along the length of the cable 10 so as to support various equipments 20, such as marine measuring instruments.

As illustrated in FIGS. 2 and 3 of the drawings, the cable 10 has a plurality of protective metal wires 22 extending around a core area or region 24. The particular cable 10 illustrated in FIGS. 2 and 3 has a comparatively thick insulating sleeve 26 surrounding another similar, but comparatively thin insulating sleeve 28 which in turn surrounds a plurality of electrical conductors 30, each of which may also be surrounded by an insulating sleeve (not shown). The sleeves 26 and 28 and the conductors 30 comprise the core region 24 within the particular cable 10 shown. Various other known equivalent or related structures are frequently used to comprise the core region within armored marine cables which are similar to the illustrated cable 10.

When cable 10 is to be used so as to attach equipments such as instruments 20 (FIG. 1), the various wires 22 in the cable 10 at the point of attachment are severed so as to provide access to the core region 24. This results in two adjacent sets of severed wire ends. In accordance with the present invention if the cable 10 has been previously used, the severed ends of the wires 22 are treated so as to provide upon each of these ends a malleable copper coating capable of being used or serving as malleable interface in the swaging upon it of closely fitting metal sleeves 32 so as to form a comparatively strong, tight joint with this sleeve. If the cable 10 has not previously been used and the wires 22 within it have previously been coated with a zinc or similar coating, this treatment step is not considered necessary.

The treatment operation involves initially cleaning the exposed ends of the wires 22 so as to remove any material which might tend to interfere with the subsequent deposition of the copper or with the formation of a strong swaged joint upon these ends, and then depositing the copper upon the cleaned ends. Preferably, the copper is deposited electrolytically since with this manner of deposition a firm, adherent deposition is obtained without any substantial danger of damaging the core region 24 of the cable 10 during the deposition.

The precise cleaning and electrolytic deposition steps capable of being used in accordance with this invention are well known inasmuch as they are commonly practiced in preparing steel plate for plating or other treatment, for example, and in conventionally electroplating copper. In this connection, reference is made to the text "Principles and Application of Electrochemistry," volume 2, Second Edition, by Koehler, copyright 1944, published by John Wiley and Sons, Inc., New York, N.Y., pages 105 to 107 inclusive, and pages 112 to 120 inclusive. The entire disclosure of these pages of this text is incorporated herein by reference.

The various cleaning and plating operations which are preferably used in practicing this invention are indicated in FIG. 6 of the drawings. The first step is to solvent clean the ends of the wires by immersion in a common solvent such as acetone or tricholorethylene. Next, the ends are pickled in a conventional acid solution such as a 2 normal aqueous sulfuric acid solution for a comparatively short period, such as one minute. Following the pickling, the ends are rinsed, as with common tap water, and are dried, as with a common paper towel. After this, any remaining undesired material upon the ends of the steel wires is removed by abrasion, as for example, by the application of No. 400 sandpaper. Next, the products of the abrasion are wiped from the ends, again as by the application of a common paper towel.

Following these preliminary cleaning operations, a copper plating is then applied to the ends of the steel wires. As is conventional, this plate is applied in several steps. The first involves a so-called "copper strike" by plating in a solution such as one containing 5.5 ounces Rochelle salt, 4 ounces sodium carbonate, and sufficient water to form a one-gallon solution containing these solutes. Preferably, this "strike" is carried out at a temperature of 90° to 110° F., a current density of 10 to 25 amperes per square foot and a voltage of 2 to 3 volts. Plating in this type of cyanide solution for about 20 to 30 seconds is considered sufficient.

After this initial "copper strike," the ends of the wires are rinsed, as in common tap water, and are further plated in a conventional sulfate bath. A typical suitable bath contains 32 ounces of copper sulfate (pentahydrate) and 8 to 10 ounces of sulfuric acid per gallon of plating solution, with water serving as the solvent. Such plating can be at a temperature of from 60° to 120° F. at a current density of 20 to 50 amperes per square foot and a voltage of from 1 to 4 volts. It has been found that the amount of metal deposited on a strand in 10 minutes from such a bath under these conditions is adequate to provide a malleable layer serving as a malleable interface for the attachment of a sleeve 32 by swaging.

After these plating operations are completed, the ends of the wires 22 are rinsed, as with conventional tap water, and wiped clean and dry, as with a conventional paper towel. Within a period of no more than four hours after the plating, the ends are then held at a temperature of from 350° to 400° F. for a period of eight hours so as to relieve any embrittlement of the metal.

After these operations, small cylindrical sleeves (sleeves 32) may be slid upon the plated ends of the wires 22 and then swaged so as to form firm, comparatively strong connections with the ends of these wires 22. The particular sleeves 32 used are preferably of the type commonly referred to in industry as "nico-press" sleeves.

The resulting ends of the wires 22 are then as indicated in FIG. 4 of the drawings. This figure illustrates a connection structure 18 used in connecting the various severed ends of the wires 22. It will be noted that the core region 24 of the cable 10 is substantially unaffected by the use of the connecting structure 18 except where it has been modified so that a single conductor 34 extends from it. This conductor 34 may be utilized with one of the instruments 20.

The structure 18 includes two end ferrules 36 which are slipped over the cable 10 so that the cable 10 extends through openings 38 in these ferrules 36. It will be noted that the openings 38 include flared ends 40 which serve to minimize any tendency toward abrasion of the wires 22 in cable 10. These ferrules 36 include external shoulders 42 serving the functions as hereinafter described. The ferrules 36 are used so as to generally face one another.

The connecting structure 18 also includes foraminated discs 44. Preferably, the foraminations in these discs 44 are slots 46 leading from the exteriors of discs 44 toward the centers of the discs. It will be noted that the discs 44 are of substantially the same diameters as the largest portions of the ferrules 36. These discs 44 are designed so that they can be located around the core region 24 of the cable 10 in the same generalized manner as the ferrules 36. When in this position, the individual wires 22 can be located within the slots 46 so that each of the sleeves 32 bears against a surface of one of the discs 44 as indicated in FIG. 4 of the drawings.

The connecting structure 18 is completed by split cylindrical housing sections 48 having internal grooves 50, each groove 50 fitting around and engaging a disc 44 and a ferrule 36. It will be noted that the shoulder 42 on each ferrule 36 extends within one of the grooves 50. These housing sections 48 are, after being positioned in this manner, preferably attached to one another through the use of bolts 52 or equivalent means on extending flanges 54.

It will be seen from the foregoing that the structure 18 utilizes the discs 44 essentially as engaging means to physically engage the swaged sleeves 32 on the ends of the wires 22, and that it utilizes the attached housing sections 48 as mechanical means physically connecting such engaging means. As a result of this type of structure, force is transmitted through the ends of the wires 22 along the length of the cable 10 through the connecting structure 18 as the cable 10 itself is subjected to tension. The connecting structure thus takes the place of the wires 22 for structural purposes in the severed area along the length of the cable 10. It also serves to protect the core area 24 in this region or area.

Because of the manner in which this conducting structure 18 operates, it is quite important that a reliable, comparatively "strong" connection be achieved between the sleeves 32 and the wires 22. Because of this, the use of malleable copper layers upon the severed ends of the wires 22 is considered quite important, particularly when a connecting structure 18 is to be installed on a previously used marine cable such as the cable 10.

If desired, various equipments to be used in conjunction with the cable 10 can be attached directly to the housing sections 48. Thus, the instruments 20 previously indicated can be carried upon it. If desired, an opening 56 provided with an insulating bushing 58 may be located in one of the sections 48 so as to provide for the conductor 34 going outside of the connecting structure 18.

While a particular embodiment of the present invention has been shown and described, it will be obvious to those skilled in the art that changes and modifications may be made without departing from this invention in its broader aspects, and therefore, the aim in the appended claims is to cover all such changes and modifications as fall within the true spirit and scope of this invention.

The embodiments of the invention in which an exclusive property or privilege is claimed are defined as follows:

1. A connecting structure adapted to be re-used after being subjected to salt water which comprises:
   an armored cable having a core region including electrical conductors and being surrounded by protective wires,
   said cable being severed to expose said electrical conductors and to provide two opposing sets of said protective wire ends, the ends of said wires being coated with a substantially non-corrosive malleable metal coating,
   a swaged member secured upon the ends of each of said sets of adjacent wire ends, the metal coating serving as a malleable interface between the swaged members and the wires,
   a separate engaging means physically engaging the swaged members on each of said sets, and
   mechanical means physically engaging and connecting said engaging means so as to provide a load bearing transmission path between said sets of severed wires.

2. The connecting structure as defined in claim 1 wherein said engaging means are foraminate discs, and wherein said wires pass through said discs and said swaged members engage surfaces of said discs in load bearing relationship therewith.

3. The connecting structure as defined in claim 2 wherein the foraminates in said discs are slots leading from the peripheries of said discs towards the centers of said discs.

4. The connecting structure as defined in claim 1 wherein said malleable metal is copper.

5. The connecting structure as defined in claim 1 wherein the ends of said wires engaged by said swaged members are coated with a copper serving as a malleable interface between said swaged members and said wires,
   wherein said engaging means are foraminate discs having slots extending from the periphery of said discs towards the centers of said discs,
   wherein said swaged members engage opposite surfaces of said discs,
   wherein said wires extend through said slots, and
   wherein said mechanical means engages the periphery of said discs so as to physically connect said discs and so as to close off the entrances of said slots preventing said wires from coming out of said slots.

6. A process of treating a previously used armored cable for re-use which comprises the steps of:
   severing the protective wires around said cable so as to provide two sets of severed ends,
   cleaning said ends,
   electro-depositing a layer of corrosion resistant malleable metal capable of serving as a malleable interface in creation of a swaged joint upon said ends,
   swaging members upon said ends of said wires of said sets,
   placing the swaged members of said ends in contact with surfaces of engaging members, a different engaging member being used for each of said sets, and
   physically connecting said engaging members.

7. The process as defined in claim 6 wherein said malleable metal is copper.

8. The process as defined in claim 7 wherein said layer placing step includes applying a copper strike to said cleaned ends followed by electrolytically depositing said layer of copper.

References Cited

UNITED STATES PATENTS 3,324,517    6/1967    Glowacz        174—89 XR

FOREIGN PATENTS 746,165    3/1933    France.

DARRELL L. CLAY, *Primary Examiner.*

U.S. Cl. X.R.

24—122.6; 29—628; 174—79